H. GODFREY.
WAVE MOTOR.
APPLICATION FILED DEC. 12, 1919.

1,370,304.

Patented Mar. 1, 1921.

Inventor
H. Godfrey.

By Geo. P. Kimmel
Attorney

UNITED STATES PATENT OFFICE.

HARVEY GODFREY, OF BUFFALO, NEW YORK.

WAVE-MOTOR.

1,370,304.

Specification of Letters Patent.

Patented Mar. 1, 1921.

Application filed December 12, 1919. Serial No. 344,458.

*To all whom it may concern:*

Be it known that I, HARVEY GODFREY, a citizen of the United States, residing at Buffalo, in the county of Erie and State of New York, have invented certain new and useful Improvements in Wave-Motors, of which the following is a specification.

This invention has for its primary object to provide a simple and compact apparatus capable of converting the relative movement of certain of the parts thereof due to the constant shifting of the position of the entire apparatus coincident with the action of the waves into mechanical power for utilization in the operation of electrical generators or other machines.

Another important object of the invention resides in the provision of a wave motor wherein the movement converting and transmitting mechanism is entirely inclosed within a casing which in itself constitutes a float for maintaining the apparatus in a predetermined position with relation to the surface of the body of water and preventing contact of such water with the internal mechanism of the motor.

With these and other objects in view as will appear as the description proceeds the invention comprises the novel features of construction, combination and arrangement of parts which will be more fully described in the following specification and set forth with particularity in the claims appended hereunto.

Figure 1:
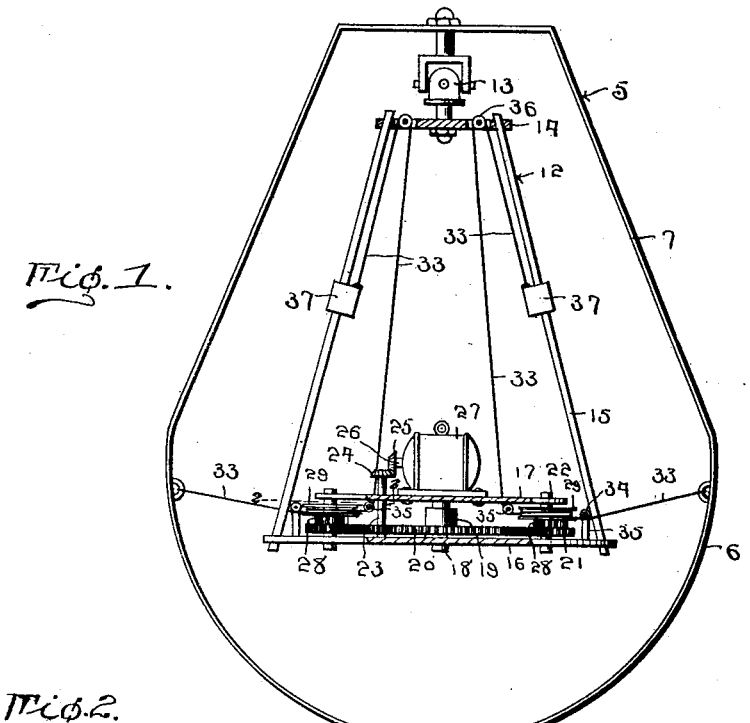
Figure 1 represents a vertical longitudinal sectional view through the improved motor.
Figure 2:
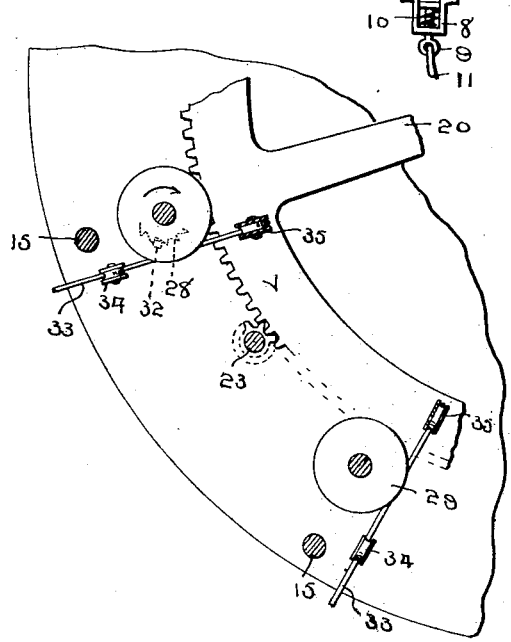
Fig. 2 represents a fragmentary sectional view through the pivotally suspended frame taken on the line 2—2 of Fig. 1.
Figure 3:
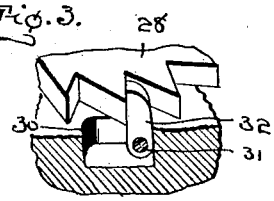
Fig. 3 represents an enlarged fragmentary sectional view, in perspective, of the drum carried pawl and ratchet wheel coacting therewith.

Referring to the drawings in detail, wherein similar reference numerals designate corresponding parts throughout the several views, the numeral 5 indicates a hollow float which may be constructed of sheet metal of proper thickness to lend requisite strength and rigidity thereto and comprises a semi-spherical lower portion 6 and a tapered truncated upper portion 7. The float or casing is sealed airtight and contains air at approximately atmosphere pressure to provide for the desired buoyancy thereof.

The lower semi-spherical portion of the float casing is provided with a substantially U-shaped strap 8 receiving a swivel bolt 9 having a headed upper extremity constituting an abutment for one terminal of a cushion spring 10 the opposite extremity of which is engaged with the web portion of the U-shaped strap 8 for yieldably checking the movement of the motor when the cable 11 connected with the lower extremity of the bolt 9 is drawn taut. The opposite extremity of the flexible cable 11 is anchored at the bottom or bed of the body of water in which the wave motor is located and limits the extent of movement of the float upon the surface of the water.

A frame 12 is movably suspended from the upper truncated extremity of the casing by an approved type of universal joint 13 whereby the frame 12 may freely swing in any direction within the casing or float.

The frame structure 12 consists of an upper supporting plate 14 having connection with the lower movable member of the universal joint 13 and a plurality of downwardly extending and diverging supporting rods 15 are connected with the plate 14 at uniformly spaced intervals and the lower extremities of the rods are connected with and support supporting plate 16. A bearing plate 17 is arranged in superposed position above the plate 16 and coacts therewith in supporting the operating mechanism of the wave motor.

The superposed bearing plates 16 and 17 are provided with vertically alined bearings receiving a shaft 18 on which the hub 19 of the relatively large centrally disposed gear wheel 20 is rotatably mounted. A series of planetary gear wheels 21 is arranged in uniformly spaced relation about and in mesh with the teeth of the central gear wheel 20 and are journaled upon shafts 22 supported in the plates 16 and 17. A vertically disposed shaft 23 is journaled in the plates 16 and 17, extends a distance above the last mentioned plate and is provided with a bevel gear wheel 24 which meshes with a corresponding gear wheel 25 carried by the shaft 26 of an electric generator or other machine 27 whereby the rotary movement of the large central gear wheel 20 is transmitted thereto during operation of the wave motor.

A ratchet wheel 28 is rigidly connected with each gear wheel 21 and, as will be understood, the teeth of the several ratchet wheels are arranged in corresponding relation. Drums 29 are rotatably mounted upon the shafts 22 above the ratchet wheels 28 and are provided with recesses 30 receiving pivot pins 31 pivotally supporting pawls 32 which coact with the teeth of the ratchet wheels 28 to cause the latter to revolve in one direction, with the drum carried pawl.

A series of actuating cables corresponding in number to the planetary gear wheels 21 are connected at one terminal to the semi-spherical portion of the float or casing 5 in a plane slightly above that of the bottom supporting plate 16 and are extended beneath guide pulleys 34 mounted in uprights 35 carried by the plate 16. From the pulleys 34 the cables are engaged and wound spirally about the drums 29 extend inwardly therefrom beneath guide rollers, 35 and are extended upwardly inside of the frame structure 12, over guide pulleys 36 in the upper plate 14 and the terminals thereof are connected with vertically movable counterbalancing weights 37 slidably mounted on the frame rods 15 whereby the movement of the weights is guided. In order to secure maximum rotating efficiency of at least one of the drums 29 regardless of the direction in which the pivotally suspended frame stays, five planetary drums and cables are preferably provided although the number may be increased or decreased as necessity or preference may dictate.

In applying the invention to use, the float or casing is sealed airtight and is disposed upon the surface of a body of water, such for instance as the ocean. The radius of movement of the motor upon the surface of the water is controlled by the length of the anchoring cable 11 which, as will be understood, is suitably anchored at its lower terminal at the bed or bottom of the body of water. The rocking or pitching of the float or casing due to its motion with the waves causes the pivotally suspended frame structure 12 to oscillate therein on the universal joint 13. As the frame structure swings upon one side of the float or casing 5 the cable at the opposite side of the casing or float produces a rotary movement of the drum 29 with which it is connected and due to the coöperation between the pivoted pawl 32 and the teeth of the ratchet wheel 28, the rotary movement of the drum during the receding movement of the frame structure produces a corresponding rotary movement of the planetary gear 21, the movement of the latter gear being transmitted to the large gear wheel 20 and thence through the shaft 23 to the generator 27. As the float or casing is tilted in the opposite direction, the frame structure 12 swings back producing a slack in the cable 33 which is immediately taken up by the weight 37 which slides downwardly upon the rod 15 exerting a longitudinal pull upon the cable, the drum 29 being permitted to rotate to take up the slack in the cable due to the pawl 32 moving over the inclined faces of the teeth of the ratchet wheel 28. As the slack in one cable is being taken up by the counterbalancing weight the cable at the opposed side of the frame structure operates to produce a rotary movement of the drum 29 associated therewith and thus continues the rotary movement of the large gear wheel 20 in one direction.

From the foregoing it is evident that the pivotally supported frame structure 12 constitutes a pendulum the motion of which with relation to the movement of the float is utilized in the generation of motive power. It is further evident that if desired the float may be utilized as a support for a light buoy.

What I claim is:

1. A wave motor comprising a hollow float, a frame structure pivotally suspended for universal swinging movement in said float, a rotatable member carried by said frame structure, flexible members connected internally of the float, and means coacting with said flexible members for producing rotary movement of the rotatable member during swinging movement of the frame structure.

2. A wave motor comprising a hollow float, a frame structure pivotally suspended for universal swinging movement therein, a rotatable member carried by the frame structure, a plurality of flexible members connected at various points internally of the float, winding drums receiving portions of said flexible members, and means for transmitting the rotary movement of said drums to the rotatable member.

3. A wave motor comprising a hollow float, a frame structure pivotally supported for swinging movement therein, a rotatable member carried by the frame structure, a plurality of flexible members connected at various points internally of the float, winding drums, said flexible members having the medial portions thereof coiled about said drums, counter-balancing weights connected with the flexible members for taking up the slack therein, and means for transmitting the rotary movement of said drums to said rotatable member.

4. A wave motor comprising a hollow float, a frame structure pivotally mounted for universal swinging movement therein, a rotatable member carried by said frame structure, a plurality of flexible members secured internally of the float, winding drums, portions of said flexible members being coiled about said drums, means for transmitting rotary movement of said drums to said rotatable member, said frame structure comprising a plurality of guide rods, and weights slidably mounted on said guide rods and connected with the terminals of the flexible members for taking up the slack therein.

In testimony whereof I affix my signature hereto.

HARVEY GODFREY.